(12) United States Patent
Tas et al.

(10) Patent No.: US 12,098,104 B2
(45) Date of Patent: Sep. 24, 2024

(54) CARBONATABLE CALCIUM SILICATE-BASED CEMENTS AND CONCRETES HAVING MINERAL ADDITIVES, AND METHODS THEREOF

(71) Applicant: Solidia Technologies, Inc., Piscataway, NJ (US)

(72) Inventors: Ahmet Cuneyt Tas, Piscataway, NJ (US); Deepak Ravikumar, Piscataway, NJ (US); Jason E. Bryant, Easton, PA (US)

(73) Assignee: SOLIDIA TECHNOLOGIES, INC., San Antonio, TX (US)

( * ) Notice: Subject to any disclaimer, the term of this patent is extended or adjusted under 35 U.S.C. 154(b) by 65 days.

(21) Appl. No.: 17/742,191

(22) Filed: May 11, 2022

(65) Prior Publication Data

US 2022/0340491 A1    Oct. 27, 2022

Related U.S. Application Data

(62) Division of application No. 15/928,881, filed on Mar. 22, 2018, now Pat. No. 11,352,297.

(60) Provisional application No. 62/475,384, filed on Mar. 23, 2017.

(51) Int. Cl.
| | |
|---|---|
| *C04B 28/00* | (2006.01) |
| *C04B 14/30* | (2006.01) |
| *C04B 24/28* | (2006.01) |
| *C04B 28/18* | (2006.01) |
| *C04B 103/32* | (2006.01) |
| *C04B 103/40* | (2006.01) |

(52) U.S. Cl.
CPC .......... *C04B 28/188* (2013.01); *C04B 14/30* (2013.01); *C04B 14/307* (2013.01); *C04B 14/308* (2013.01); *C04B 24/286* (2013.01); *C04B 2103/32* (2013.01); *C04B 2103/408* (2013.01); *Y02P 40/18* (2015.11)

(58) Field of Classification Search
CPC ..... C04B 28/188; C04B 14/30; C04B 14/307; C04B 14/308; C04B 24/286; C04B 2103/408
See application file for complete search history.

(56) References Cited

U.S. PATENT DOCUMENTS

| | | | |
|---|---|---|---|
| 4,163,728 A * | 8/1979 | Cheng ...................... | C01F 5/06 |
| | | | 252/389.61 |
| 2016/0021757 A1 | 1/2016 | Hidehira .............. | H05K 3/0097 |
| | | | 29/830 |

(Continued)

FOREIGN PATENT DOCUMENTS

| | | |
|---|---|---|
| JP | 2001097784 A | 4/2001 |
| JP | 2005281087 A | 10/2005 |

(Continued)

*Primary Examiner* — James E McDonough
(74) *Attorney, Agent, or Firm* — BRYAN CAVE LEIGHTON PAISNER LLP

(57) ABSTRACT

The invention provides novel methods and novel additive compositions and use thereof in a wide range of concrete production for improving properties of concrete materials, such as durability and aestheticity. The methods and compositions of the invention may be applied in a variety of cement and concrete components in the infrastructure, construction, pavement and landscaping industries.

10 Claims, 16 Drawing Sheets

(56) References Cited

U.S. PATENT DOCUMENTS

| | | | |
|---|---|---|---|
| 2016/0031757 A1* | 2/2016 | Atakan | .................. C04B 28/10 |
| | | | 428/402 |
| 2016/0272544 A1 | 9/2016 | Sahu et al. | |
| 2016/0340261 A1 | 11/2016 | Atakan et al. | |

FOREIGN PATENT DOCUMENTS

| | | | |
|---|---|---|---|
| JP | 2006-213559 | A | 8/2006 |
| JP | 2007022884 | A | 2/2007 |
| JP | 2011-168436 | A | 9/2011 |
| JP | 2014-516023 | A | 7/2014 |
| JP | 2016511216 | A | 4/2016 |
| JP | 2016519038 | A | 6/2016 |
| JP | 2016531077 | A | 10/2016 |
| JP | 2017527516 | A | 9/2017 |
| JP | 2020511392 | A | 4/2020 |
| WO | 2009/132692 | A1 | 11/2009 |
| WO | 2012/122031 | A2 | 9/2012 |
| WO | 2014/159832 | A1 | 10/2014 |
| WO | 2015026900 | A2 | 2/2015 |
| WO | 2016/022485 | A1 | 2/2016 |

\* cited by examiner

FIG. 17(A)-(B)

CARBONATABLE CALCIUM SILICATE-BASED CEMENTS AND CONCRETES HAVING MINERAL ADDITIVES, AND METHODS THEREOF

PRIORITY CLAIMS AND RELATED PATENT APPLICATIONS

This application is a Divisional of U.S. patent application Ser. No. 15/928,881, filed on Mar. 22, 2018, which claims the benefit of priority to U.S. Provisional Application No. 62/475,384, filed on Mar. 23, 2017, the entire contents of which are incorporated herein by reference.

FIELD OF THE INVENTION

The invention generally relates to calcium silicate-based cements and concretes. More particularly, the invention relates to novel additive compositions and use thereof in a wide range of concrete production (e.g., drycast or wetcast) for improving properties of concrete materials, such as durability and aesthetic qualities. The methods and compositions of the invention may be applied in a variety of cement and concrete components in the infrastructure, construction, pavement and landscaping industries.

BACKGROUND OF THE INVENTION

Concrete is the most consumed man-made material in the world. A typical concrete is made by mixing Portland cement, water and aggregates such as sand and crushed stone. Portland cement is a synthetic material made by burning a mixture of ground limestone and clay, or materials of similar composition in a rotary kiln at a sintering temperature of around 1,450° C. Portland cement manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone.

Recently, a revolutionary form of cement that is based on carbonatable calcium silicate materials has emerged as a promising substitute to traditional cements. Production of carbonatable calcium silicate-based cements involves significantly reduced $CO_2$ emissions and energy consumption. In addition, this new cement sequesters $CO_2$ when cured into concrete products because $CO_2$ is needed to react with the carbonatable calcium silicate materials during the curing process to form concrete products.

Precast concrete is widely used in many different applications and involves the casting of concrete into reusable forms that are often cured under controlled conditions. In many applications, aesthetic qualities are equally as important as the physical or mechanical properties of the products. As a result, much of the value for many precast products, such as wall panels, blocks, pavers, and stonecast, is predicated on meeting stringent and often highly demanding aesthetic criteria.

Therefore, a need exists in the field of concrete production, particularly for precast concrete produced with carbonatable calcium silicate-based cements, for low cost materials and reliable and efficient methodologies that achieve excellent mechanical and durability properties accompanied by high aesthetic qualities in concrete products.

SUMMARY OF THE INVENTION

The invention provides novel methods and compositions for improving both aesthetic qualities and physical properties (e.g., mechanical and durability properties) of carbonatable calcium silicate-based cement and concrete products.

The carbonatable calcium silicate-based cement composition of the invention comprises specially selected mineral additives, typically in coarse, fine, and ultra-fine particulate or powdery forms, used to improve the durability and aesthetic properties of concrete products, especially in various precast applications. For example, magnesium oxide (MgO) powder is used to alter the water permeability of precast concrete products manufactured from carbonatable calcium silicate-based cements through refinement or modifications of pore structures, improved particle gradation, and induced crystal morphologies. Ultra-fine magnesium oxide may also be employed in an accelerated carbonation curing process to stabilize certain calcium carbonate polymorphs, such as aragonite, and even dolomite, and improve the durability properties of calcium silicate-based binders through matrix stabilization and enhancement of water-resistance or water permeability.

In one aspect, the invention generally relates to a carbonatable composition. The carbonatable composition includes: calcium silicate; one or more discrete calcium silicate phases selected from CS (wollastonite or pseudowollastonite), C3S2 (rankinite), C2S (belite, larnite, bredigite), and an amorphous calcium silicate phase at about 10% or more by mass of the total phases; and one or more minerals wherein the minerals comprise of magnesium, magnesium oxide, magnesium nitrate, magnesium sulfate, magnesium chloride, magnesium acetate, ground dolomite, ground limestone, suspension of magnesium hydroxide and combinations thereof, such that the minerals therein accounts for about 0.02% to about 20% by weight of the carbonatable composition. The elemental Ca and elemental Si are present in the composition generally at a molar ratio from about 0.5 to about 1.5. Metal oxides of Al, Fe and Mg are generally present in the composition at about 30% or less by mass. The carbonatable composition is suitable for carbonation with $CO_2$ as a reactive species at a temperature from about 30° C. to about 90° C. to form $CaCO_3$ with a mass gain of about 10% or more.

In another aspect, the invention generally relates to a method for forming a concrete product. The method includes: prior to curing cement to form a concrete product, adding to the concrete mixture an admixture comprising one or more minerals wherein the minerals comprise of magnesium, magnesium oxide, magnesium nitrate, magnesium sulfate, magnesium chloride, magnesium acetate, ground dolomite, ground limestone, suspension of magnesium hydroxide and combinations thereof, and curing the cement to form a concrete product. The cement is a carbonatable calcium silicate-based cement. The above-mentioned minerals present in the concrete mixture accounts for about 0.02% to about 20% by weight of the carbonatable calcium silicate-based cement present therein.

In yet another aspect, the invention generally relates to a concrete product produced by a method disclosed herein.

In yet another aspect, the invention generally relates to a composite material produced by carbonation of calcium silicate with $CO_2$, comprising interlocking acicular polymorphs of calcium carbonate.

In yet another aspect, the invention generally relates to a composite material. The composite material includes: a plurality of bonding elements, wherein each bonding element includes a core comprising primarily calcium silicate, a silica-rich inner layer, and a calcium carbonate-rich outer layer. The composite material includes a plurality of filler particles. The plurality of bonding elements and the plurality of filler particles together form one or more interlocking acicular polymorphs.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, similar numerals are used to indicate similar parts throughout the various views.

DETAILED DESCRIPTION OF THE INVENTION

Figure 1:
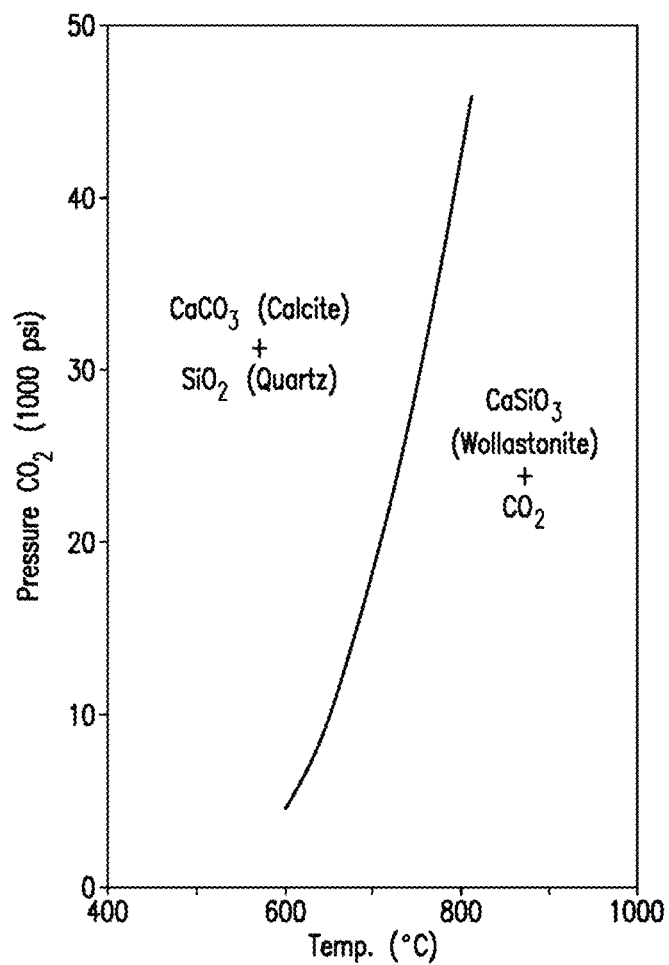
FIG. 1 is a pressure-temperature phase diagram showing the phases pertinent to the reversible reaction $CaCO_3 + SiO_2 \leftrightarrow CaSiO_3$ (calcium silicate)$+CO_2$.
Figure 2:
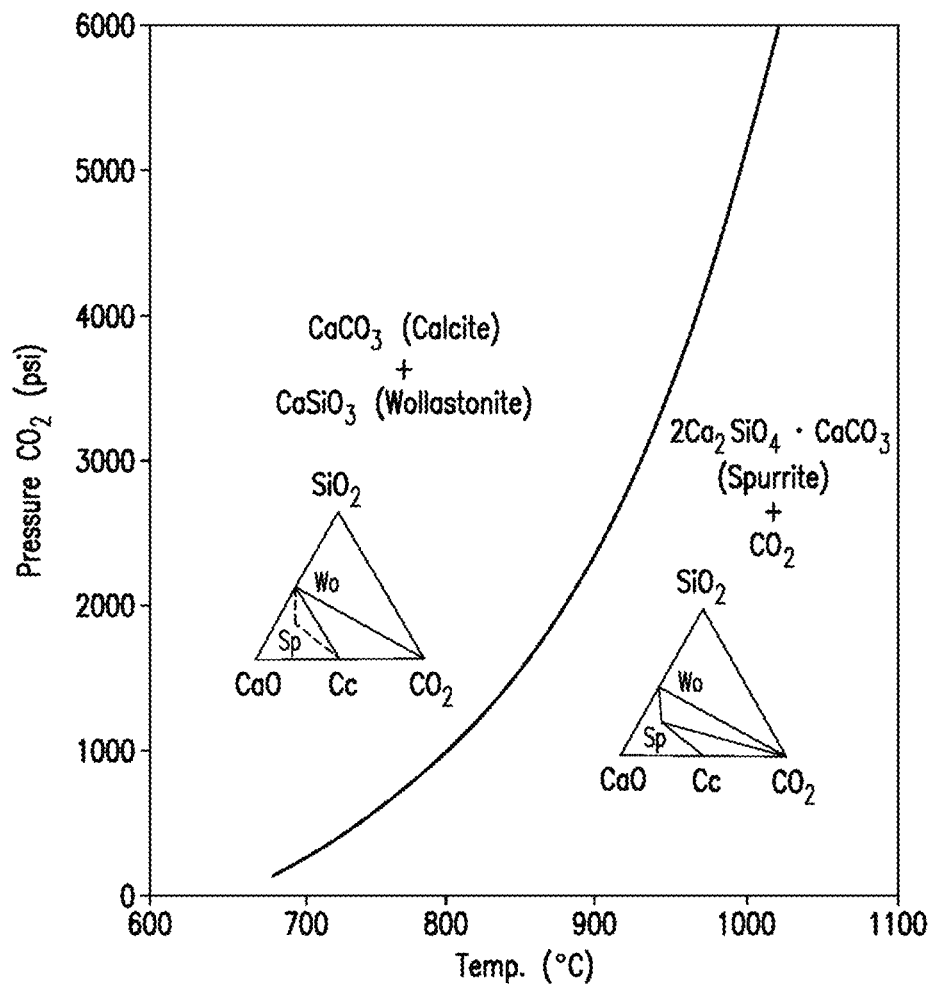
FIG. 2 is a pressure-temperature phase diagram showing the phases pertinent to the reversible reaction $3CaCO_3 + 2CaSiO_3 \leftrightarrow 2Ca_2SiO_4 \cdot CaCO_3 + CO_2$.
Figure 3:
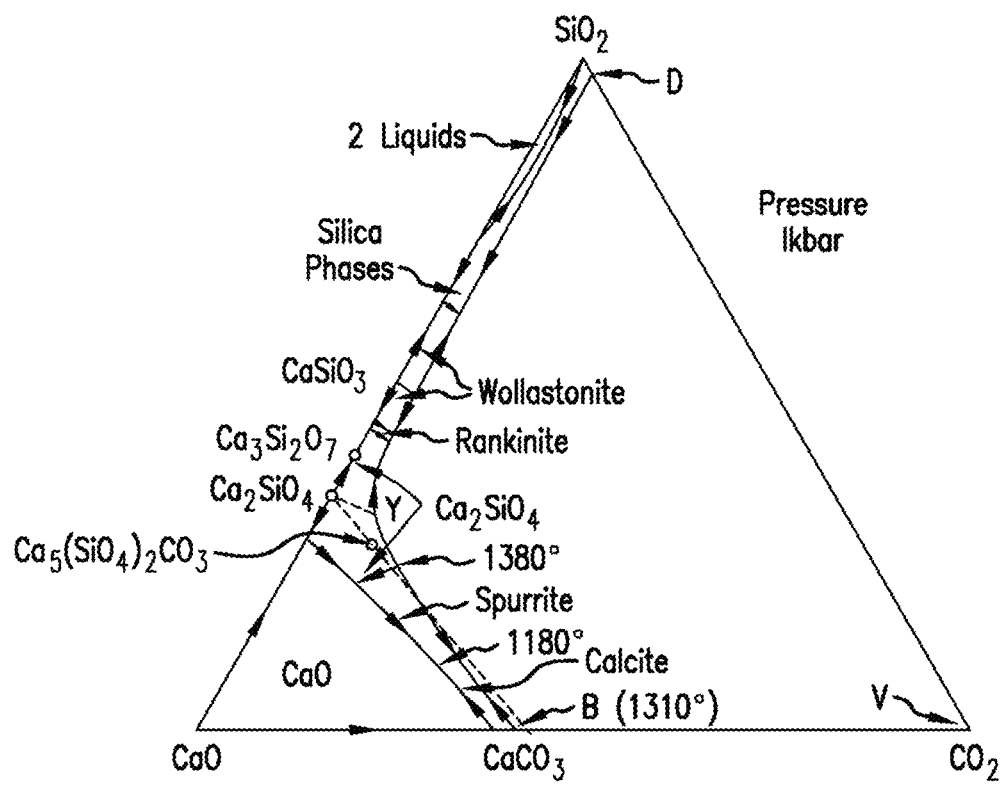
FIG. 3 is a phase diagram of the $CaO$—$SiO_2$—$CO_2$ system at a pressure of 1 kilobar.
Figure 4:
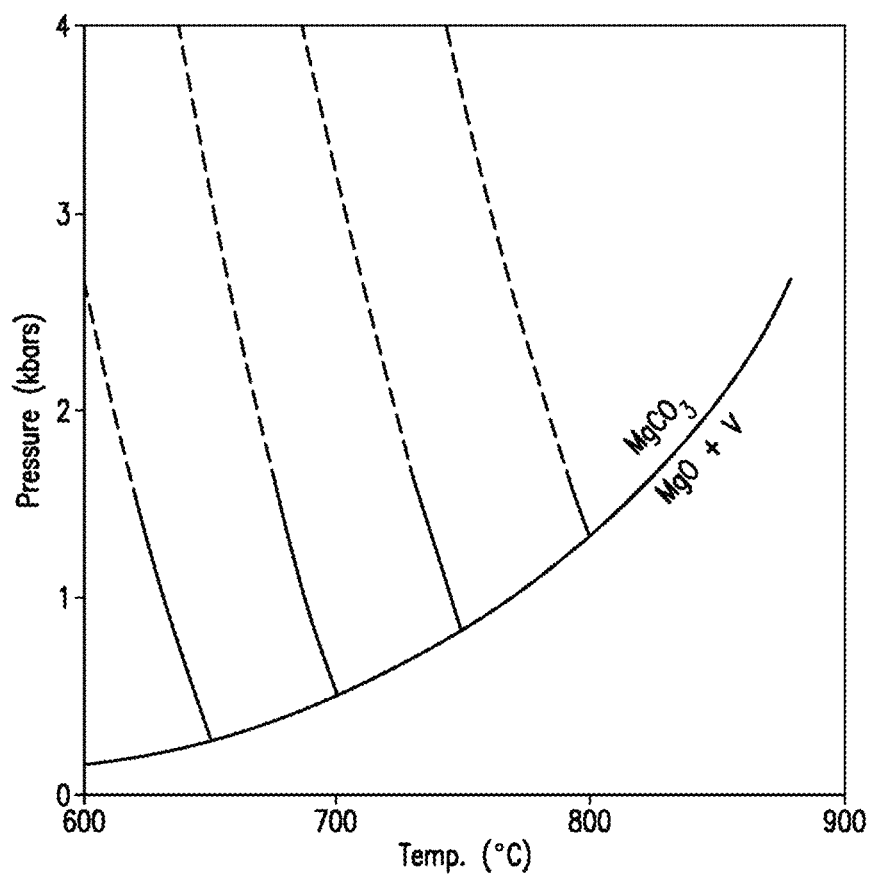
FIG. 4 is a pressure-temperature phase diagram showing the phases pertinent to the reversible reaction $MgO + CO_2 \leftrightarrow MgCO_3$.
Figure 5:
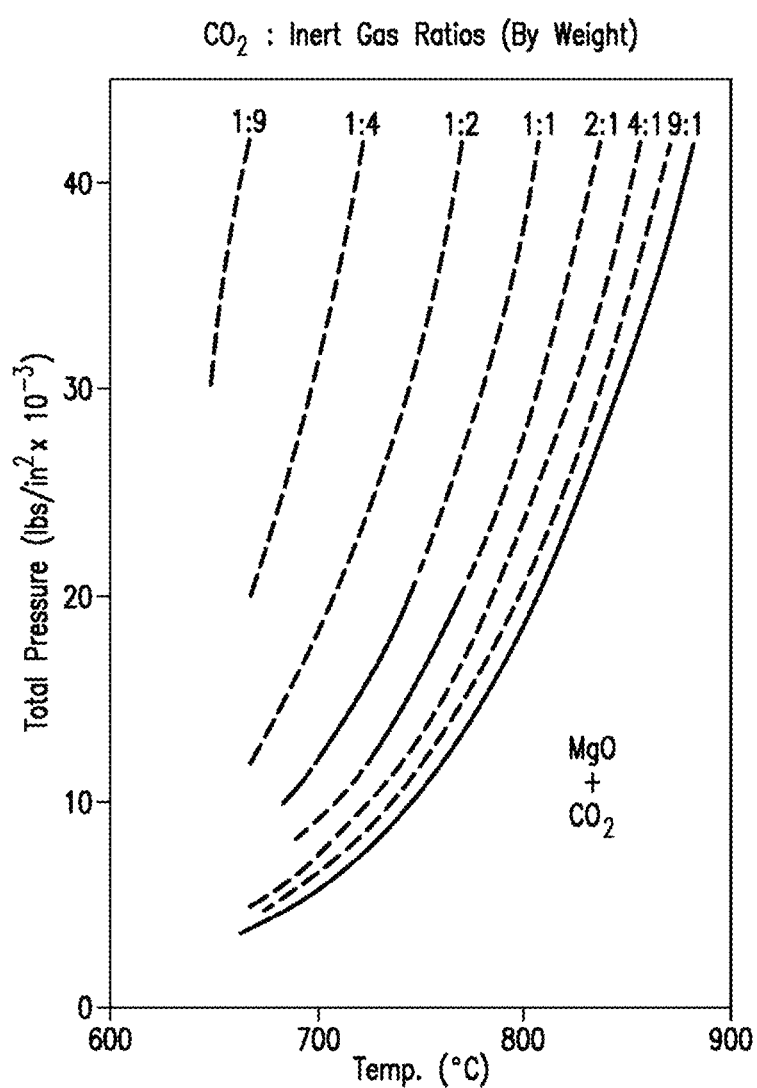
FIG. 5 is a pressure-temperature phase diagram showing the equilibrium curves for the reversible reaction $MgO + CO_2 \leftrightarrow MgCO_3$ as a function of the proportion of $CO_2$ in an inert gas.
Figure 6:
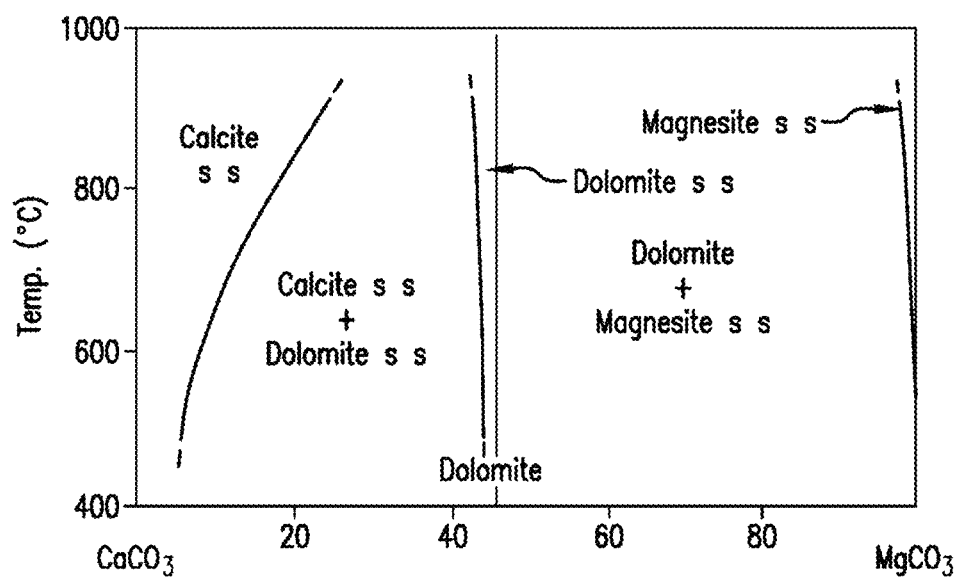
FIG. 6 is a temperature-composition phase diagram that illustrates the stability regions for various phases in the $CaCO_3$—$MgCO_3$ system.
Figure 7:
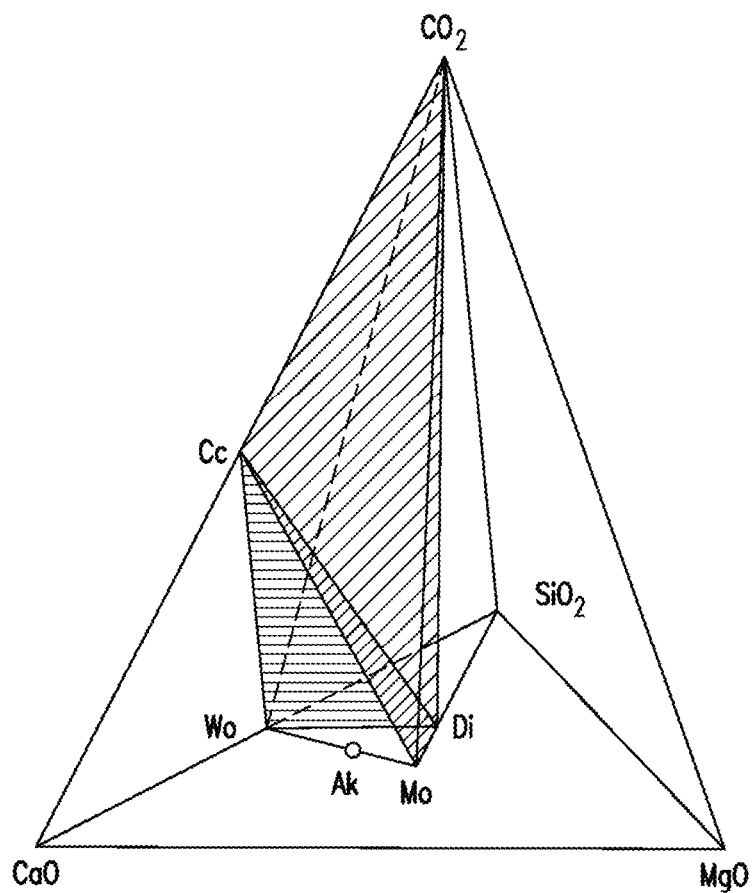
FIG. 7 is a tetrahedron diagram illustrating the phase relationships among the compounds CaO, MgO, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
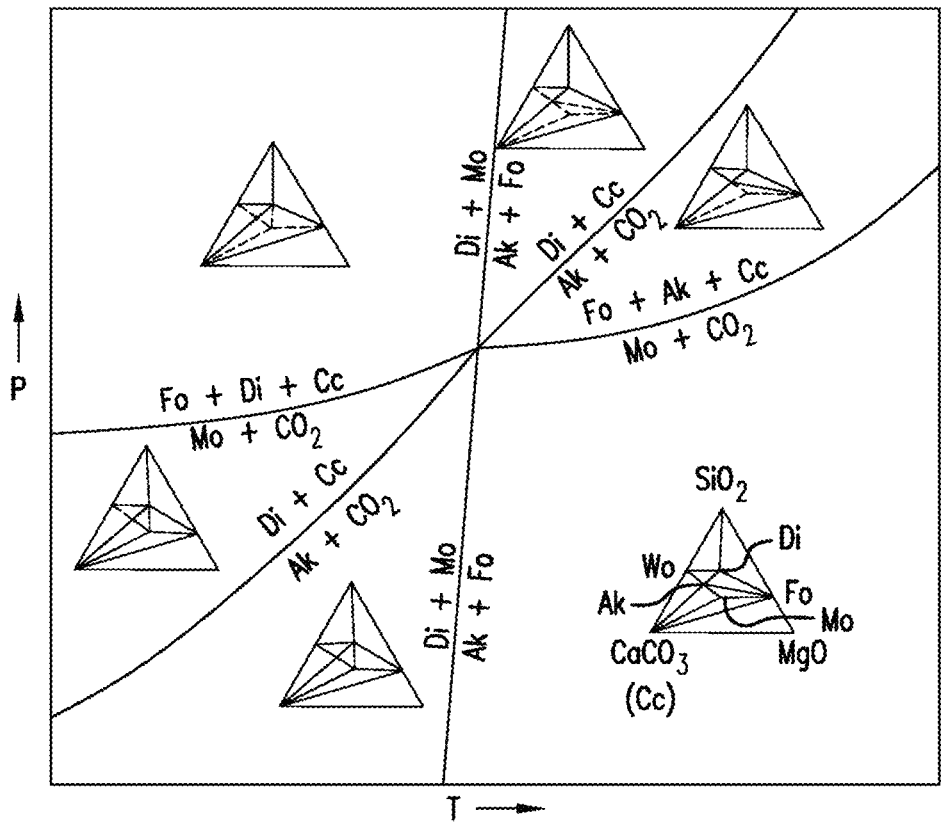
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, MgO and $SiO_2$.

The inventions provide novel approaches to improve the strength, durability and aesthetic properties of carbonatable calcium silicate-based cements and concrete products.

The carbonatable calcium silicate-based cement composition of the invention comprises coarse, fine, and ultra-fine specially selected mineral additives to improve the strength, durability and aesthetic properties of concrete products in various precast applications.

Carbonatable calcium silicate-based cements and concretes are revolutionary replacements for conventional cement and concrete products. These materials can be produced and utilized with significantly reduced energy requirement and $CO_2$ emissions. The carbonatable calcium silicate compositions are made from widely available, low cost raw materials by a process suitable for large-scale production with flexible equipment and production requirements. This unique approach is accompanied by a remarkable proficiency for permanent and safe sequestration of $CO_2$. A wide variety of applications can benefit from the invention through improved energy consumption and more desirable carbon footprint, from construction, pavements and landscaping, to infrastructure and transportation.

Particular use of the invention involves calcium silicate-based cements that achieve strength through carbonation reaction processes wherein carbon dioxide is sequestered in the presence of water. While water is necessary for certain provisions such as dispersion and forming, it is not a primary component of the final reaction products. In certain instances, this may result in a porous matrix that may allow the ingress of water and subsequently lead to aesthetic defects and surface depositions.

As disclosed herein, it has been unexpectedly discovered that the addition of certain mineral compositions (e.g., magnesium oxide) to a concrete mix can mitigate or reduce aesthetic defects and surface depositions.

Without wishing to be bound by the theory, the formation of needles or whisker-like crystals of hydrated or anhydrous magnesium carbonates, calcium magnesium carbonates and/or magnesium hydroxycarbonates, if and when they form inside the open-ended capillaries or orifices of the bonding element-rich areas of the pavers or construction materials, would alter the nature and extent of water transport there. Water can readily penetrate and transport through, at the ambient pressure and temperature, capillaries, orifices and interconnected pore channels having sizes greater than 1.4 μm, but the formation of such submicron-sized crystals within such waterways will drastically alter the water flow pattern and will render the situation more similar to the case of ordinary Portland cement (OPC)-based pavers.

Furthermore, it has also been unexpectedly discovered that the addition of certain mineral compositions (e.g., magnesium oxide) to a concrete mix can also significantly improve the mechanical properties and durability of a product.

Without wishing to be bound by the theory, strength generation during carbonation of calcium silicate powders, which do not have the hydraulic mineral hatrurite (C3S) and which possess a Ca/Si molar ratio much lower than that of ordinary Portland cement, proceeds in two steps: (i) the formation of an X-ray-amorphous layer of silicate-rich (or Ca-deficient) gel, through which the $Ca^{2+}$ must diffuse out to the external surface that is in contact with the $CO_2(g)$, on the calcium silicate particles, and (ii) the formation of individual $CaCO_3$ crystals on that X-ray-amorphous gel layer and the further evolution of such individual $CaCO_3$ crystals into a 3D interconnected, intermingling network of $CaCO_3$.

The intentional addition of an alkali earth cation with an ionic radius smaller than that of $Ca^{2+}$ (114 μm), such as $Mg^{2+}$ (86 μm), was found, as disclosed herein, to be effective in decreasing the amount of unreacted calcium silicate remaining at the end of carbonation, which resulted in noticeable strength increases. $Mg^{2+}$ is able to diffuse greater distances throughout the very first $CO_2$-curing (i.e., weathering) product (which is Ca-deficient, X-ray-amorphous silicate-based gel layer) forming on the surfaces of Ca-silicate-based cement particles.

Again without wishing to be bound by the theory, magnesium oxide provides in situ internal de-humidification of the construction material and blocks undergoing $CO_2$ carbonation owing to the high affinity of magnesium oxide to the dynamic water films or water molecules that would be present through the pores and pore channels of the body.

Magnesium hydroxide (brucite, $Mg(OH)_2$) initially forms during the preparation of the concrete mix, upon the addition of magnesium, magnesium oxide or magnesium salt to the liquid admixture portion of the concrete mix, is able to in situ carbonate itself, during $CO_2$ curing, to one or more of magnesite ($MgCO_3$), dolomite ($CaMg(CO_3)_2$), Mg-calcite (magnesian), hydromagnesite ($Mg_5(CO_3)_4(OH)_2 \cdot 4H_2O$), nesquehonite ($Mg(HCO_3)(OH) \cdot 2H_2O$ or $MgCO_3 \cdot 3H_2O$), dypingite ($Mg_5(CO_3)_4(OH)_2 \cdot 5H_2O$), artinite ($Mg_2CO_3(OH)_2 \cdot 3H_2O$), barringtonite ($MgCO_3 \cdot 2H_2O$), or lansfordite ($MgCO_3 \cdot 5H_2O$). These are the phases that are present in the MgO—CO2·H2O ternary system. The formation of such phases requires the in situ and in realtime, dynamic water removal from their immediate surroundings. These basic (i.e., with intrinsic pH values above neutral) phases usually crystallize in acicular or needle forms and the interlocking/intermingling of these needles with one another further helps to increase the strength in the products (e.g., composite construction materials such as wall panels, blocks, pavers, and stonecast). The formation of such needles or whisker-like crystals of the magnesium carbonates, calcium magnesium carbonates and/or magnesium hydroxycarbonates, can alter the nature and extent of water transport there, since such phases would instantly increase the surface roughness of waterways intrinsic to the concrete products cured by using $CO_2$.

Figure 11:
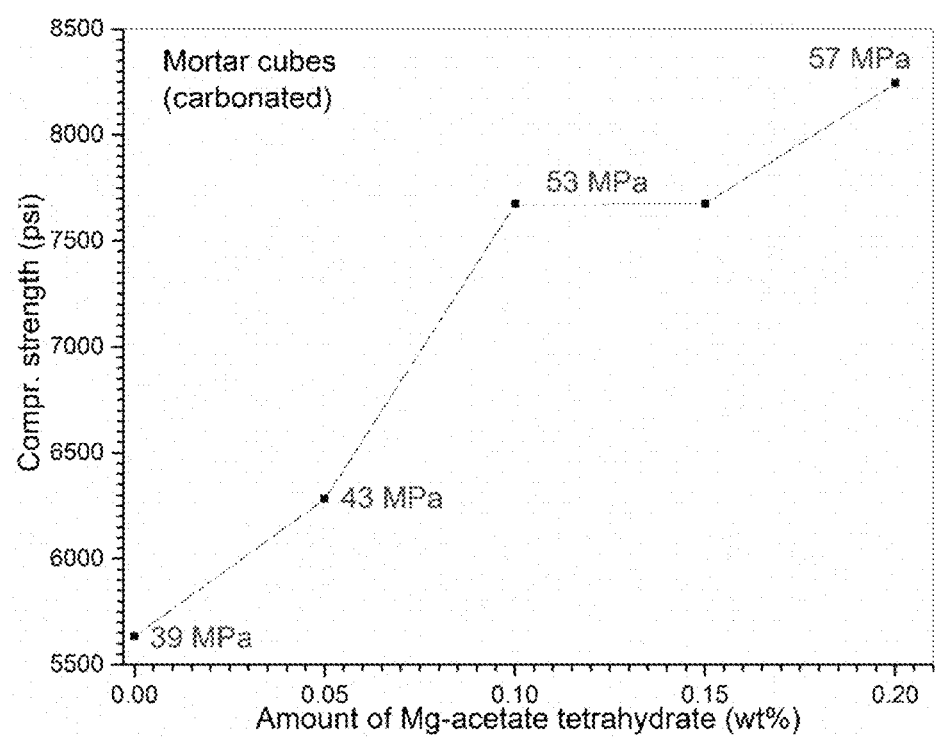
FIG. 11 shows mortar cube test results with the Mg-acetate tetrahydrate additive.

The small presence of acetate ions and/or acetic acid in the forming waters of concrete and mortar batches were also shown to increase the mean strength in the calcium silicate-based samples upon carbonation. (FIG. 11)

In stark contrast to the $CaO$—$CO_2$—$H_2O$ system, the $MgO$—$CO_2$—$H_2O$ ternary diagram presents a number of hydrated and carbonated phases (e.g., magnesite, hydromagnesite, nesquehonite, dypingite, barringtonite, protohydromagnesite, artinite and lansfordite).

Figure 12:
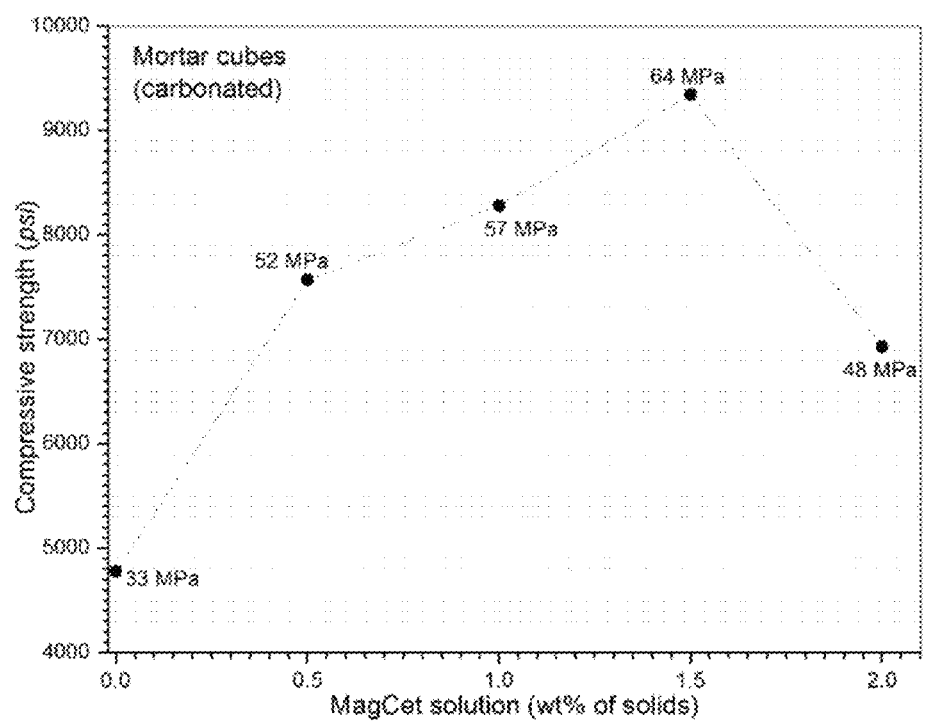
FIG. 12 shows mortar cube test results with the MagCet solution (a MgO acetic acid solution).

The addition of magnesium oxide powders, in different grades of particle size distribution(s), such as about 100 nm, about 10 μm or about 50 μm average particle sizes, and reactivity, to the wet batches of paste, mortar and concrete samples was found to help generate strength upon carbonation in moist atmospheres by forming crystals of one or more of the above-mentioned phases of the MgO—$CO_2$—$H_2O$ system. The addition of a small amount of water soluble salt of magnesium acetate ($Mg(CH_3COO)_2 \cdot 4H_2O$) or a solution of controlled pH value formed by dissolving a prescribed quantity of MgO powder in a prescribed volume of dilute acetic acid into the forming water of paste, mortar or concrete samples resulted in a noticeable strength increase upon carbonation. (FIG. 12)

Magnesium, when present even in low concentrations (<1%), was demonstrated to be a strong aragonite promoter when present in aqueous systems prone to nucleate $CaCO_3$, regardless of the processing temperature.

In certain embodiments of the invention, an ultra-fine (e.g., about 100 nm mean particle size) magnesium oxide powder is added, from about 0.02% to about 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to the liquid admixtures, which are typically acidic solutions due to the superplasticizers/dispersants used with pH values less than 5, in order to help raise the pH of these solutions, for example, to a pH of about 9 (e.g., from about 8.5 to about 9.5, from about 8.7 to about 9.3, from about 8.8 to about 9.2). This facilitates the in situ formation of magnesium hydroxide, or brucite, in order to enhance the availability of magnesium to various beneficial ternary phases.

In certain embodiments of the invention, magnesium oxide is added to regulate the viscosity of pastes or slurries through the formation of hydroxylated magnesium molecules in aqueous solutions.

In certain embodiments of the invention, magnesium oxide is added so that magnesium ions in solution can improve the reactivity of calcium-bearing silicate phases through crystallographic distortion or modification of ortho- or pyro-silicate networks containing calcium.

In certain embodiments of the invention, magnesium oxide is added to mixtures of carbonatable calcium silicate-based cement mixtures to reduce or eliminate the occurrence of metastable polymorphs of calcium carbonate and to reduce or prevent the formation of aesthetic surface defects arising from precipitation of metastable phases such as vaterite.

In certain embodiments of the invention, magnesium oxide at small percentages, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), is added to carbonatable calcium silicate-based cement mixtures to promote the formation of Mg-calcite phases such as magnesian.

In certain embodiments of the invention, magnesium oxide is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to promote the formation of acicular calcium carbonate phases such as aragonite.

In certain embodiments of the invention, magnesium oxide is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to promote the formation of dolomite.

In certain embodiments of the invention, magnesium oxide is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to stabilize Mg-calcite and/or aragonite and to minimize formation of vaterite.

In certain embodiments of the invention, magnesium oxide is added from about 0.02% to 10% (e.g., from about 0.1% to about 10%, from about 0.5% to about 10%, from about 1% to about 10%, from about 5% to about 10%, from about 0.02% to about 5%, from about 0.02% to about 2%, from about 0.02% to about 1%, from about 0.02% to about 0.1%), to carbonatable calcium silicate-based cement mixtures to enrich the microstructural diversity of the binder matrix and reduce the occurrence of structural and aesthetic degradation through water ingress.

In certain embodiments of the invention, magnesium oxide is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to promote the formation of ternary phases resistant to potential structural and aesthetic degradation in concrete applications involving exposure to acidic chemicals (e.g., from acidic rain).

In certain embodiments of the invention, magnesium oxide is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to modify carbonated calcium silicate-based cement pore structures through formation of fine needle-like or acicular calcium carbonate polymorphs. This pore structure modification can inhibit the transport of aqueous phases containing salts, organic residues, minerals, and other contaminants that may degrade the aesthetic qualities and durability of carbonatable calcium silicate-based concrete.

In certain embodiments of the invention, magnesium oxide is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to reduce the drying-shrinkage resulting from rapid drying regimes or high water/solid mixtures.

In certain embodiments of the invention, magnesium oxide is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to increase the degree of carbonation and sequestration of carbon dioxide.

In certain embodiments of the invention, ground limestone or dolomitic limestone is added, from about 0.02% to 10% (e.g., from about 0.1% to about 10%, from about 0.5% to about 10%, from about 1% to about 10%, from about 5% to about 10%, from about 0.02% to about 5%, from about 0.02% to about 2%, from about 0.02% to about 1%, from about 0.02% to about 0.1%), to carbonatable calcium silicate-based cement mixtures to refine the pore structure of carbonated calcium silicate-based binders and inhibit the transport of aqueous phases containing salts, organic residues, minerals, and other contaminants that may degrade the aesthetic qualities and durability of carbonatable calcium silicate-based concrete.

In certain embodiments of the invention, ground dolomite is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to refine the pore structure of carbonated calcium silicate-based binders and inhibit the transport of aqueous phases containing salts, organic residues, minerals, and other contaminants that may degrade the aesthetic qualities and durability of carbonatable calcium silicate-based concrete.

In certain embodiments of the invention, suspensions of magnesium hydroxide, or milk of magnesia, is added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to modify the pore structure of carbonated calcium silicate-based binders and inhibit the transport of aqueous phases containing salts, organic residues, minerals, and other contaminants that may degrade the aesthetic qualities and durability of carbonatable calcium silicate-based concrete.

In certain embodiments of the invention, combinations of coarse and fine ground limestone with different particle size distributions can be added, from about 0.02% to 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), to carbonatable calcium silicate-based cement mixtures to improve the particle packing of carbonatable calcium silicate-based cements and to reduce the paste permeability thereby inhibiting the ingress of water. This approach can be used to limit the transport of salts, organic residues, minerals, and other contaminants that may degrade the aesthetic qualities and durability of carbonatable calcium silicate-based concrete.

Thus, in one aspect, the invention generally relates to a carbonatable composition. The carbonatable composition includes: calcium silicate; one or more discrete calcium silicate phases selected from CS (wollastonite or pseudowollastonite), C3S2 (rankinite), C2S (belite, larnite, bredigite), and an amorphous calcium silicate phase at about 10% or more by mass of the total phases; and one or more minerals comprising magnesium oxide, such that magnesium oxide therein accounts for about, about 0.02% to 20%, by weight of the carbonatable composition. The elemental Ca and elemental Si are present in the composition at a molar ratio from about 0.5 to about 1.5; and metal oxides of Al, Fe and Mg are present in the composition at about 30% or less by mass. The composition is suitable for carbonation with $CO_2$ at a temperature of about 10° C. to about 90° C. to form $CaCO_3$ with a mass gain of about 10% or more.

In some embodiments, the carbonatable composition includes one or more residual $SiO_2$ and CaO phases.

In some embodiments, the carbonatable composition includes one or more melilite type phases having the general formula $(Ca,Na,K)_2[(Mg, Fe^{2+},Fe^{3+},Al,Si)_3O_7]$ or ferrite type phases having the general formula $Ca_2(Al,Fe^{3+})_2O_5$.

In some embodiments, the carbonatable composition includes about 20% (e.g., 15%, 10%, 5%) or less of metal oxides of Al, Fe and Mg by total oxide mass.

In some embodiments, the carbonatable composition includes reactive phases at about 50% or more by mass.

In some embodiments, the one or more minerals further comprise one or more of magnesium, magnesium nitrate, magnesium sulphate, magnesium chloride, and magnesium acetate.

In some embodiments, a precipitate-free solution of magnesium nitrate is produced by dissolving magnesium oxide powders of any particle size, over the typical mean particle size interval of about 0.05 to about 100 μm, in technical grade concentrated nitric acid diluted with water to prepare stock solutions of $Mg^{2+}$ ions over the concentration range of about 0.001 to about 1 M (e.g., about 0.01 to about 1 M, about 0.1 to about 1 M, about 0.001 to about 0.1 M, about 0.001 to about 0.01 M) to replace the addition of powdery magnesium nitrate salt.

In some embodiments, a precipitate-free solution of magnesium chloride is produced by dissolving magnesium oxide powders of any particle size, over the typical mean particle size interval of about 0.05 to about 100 μm, in technical grade concentrated hydrochloric acid diluted with water to prepare stock solutions of $Mg^{2+}$ ions over the concentration range of about 0.001 to about 1 M (e.g., about 0.01 to about 1 M, about 0.1 to about 1 M, about 0.001 to about 0.1 M, about 0.001 to about 0.01 M) to replace the addition of powdery magnesium chloride salt.

In some embodiments, a precipitate-free solution of magnesium sulphate is produced by dissolving magnesium oxide powders of any particle size, over the typical mean particle size interval of about 0.05 to about 100 μm, in technical grade concentrated sulphuric acid diluted with water to prepare stock solutions of $Mg^{2+}$ ions over the concentration range of about 0.001 to about 1 M (e.g., about 0.01 to about 1 M, about 0.1 to about 1 M, about 0.001 to about 0.1 M, about 0.001 to about 0.01 M) to replace the addition of powdery magnesium sulphate salt.

In some embodiments, the carbonatable composition further includes a dispersant or superplasticizer (e.g., a polycarboxylate-based polymer).

In some embodiments, the carbonatable composition further includes a colorant (e.g., one or more of iron oxide, cobalt oxide and chromium oxide).

The carbonatable composition disclosed herein may be employed in concrete production via drycast or via wetcast.

In another aspect, the invention generally relates to a method for forming a concrete product. The method includes: prior to curing cement to form a concrete product, adding to the concrete mixture an admixture comprising one or more minerals comprising magnesium oxide; and curing the cement to form a concrete product. The cement is a carbonatable calcium silicate-based cement. The magnesium oxide present in the one or more minerals accounts for about 0.02% to about 20% (e.g., about 0.02% to about 10%, about 0.05% to about 7%, about 0.05% to about 6%, about 0.05% to about 5%, about 0.05% to about 4%, about 0.05% to about 3%, about 0.05% to about 2%, about 0.05% to about 1%, about 0.05% to about 0.5%, about 0.05% to about 0.25%, about 0.1% to about 8%, about 0.5% to about 8%, about 1% to about 8%, about 2% to about 8%, about 3% to about 8%, about 4% to about 8%, about 5% to about 8%, about 6% to about 8%, about 0.25% to about 1%, about 0.5% to about 2%) by weight of the carbonatable calcium silicate-based cement.

In some embodiments, the method further includes adjusting the pH of the concrete mixture prior to curing the cement to form a concrete product.

In yet another aspect, the invention generally relates to a concrete product manufactured by a method disclosed herein.

In yet another aspect, the invention generally relates to a composite material produced by carbonation of calcium silicate with $CO_2$, comprising interlocking acicular polymorphs of calcium carbonate.

In yet another aspect, the invention generally relates to a composite material. The composite material includes: a plurality of bonding elements, wherein each bonding element includes a core comprising primarily calcium silicate, a silica-rich inner layer, and a calcium carbonate-rich outer layer. The composite material includes a plurality of filler particles. The plurality of bonding elements and the plurality of filler particles together form one or more interlocking acicular polymorphs.

In some embodiments, the filler particles are made from a silicon dioxide-rich material. In some embodiments, the plurality of filler particles comprise one or more of quartz, mica and feldspar.

In some embodiments, the plurality of bonding elements are chemically transformed from ground wollastonite. In some embodiments, the plurality of bonding elements are chemically transformed from a precursor calcium silicate other than wollastonite.

In some embodiments, the composite material further includes a colorant, e.g., one or more of iron oxide, cobalt oxide and chromium oxide. In some embodiments, the colorant is present in an amount from 0% to about 10% by weight of the composite material.

In some embodiments, the composite material further includes a discoloration control additive, e.g., one or more of magnesium, magnesium oxide, magnesium nitrate, magnesium sulphate, magnesium chloride, and magnesium acetate. In some embodiments, the discoloration control additive is present in an amount from 0.02 to about 20% by weight of the bonding elements.

In some embodiments, the concrete product comprises one or more $CaCO_3$ phases selected from calcite-aragonite, aragonite, calcite-aragonite-dolomite, calcite-dolomite, aragonite-dolomite and dolomite.

In some embodiments, the concrete product is characterized by acid rain resistant properties.

In some embodiments, the concrete product comprises one or more $CaCO_3$ phases selected from calcite-aragonite-dolomite, calcite-dolomite, aragonite-dolomite and dolomite.

In certain embodiments of the method, the cement is a carbonatable calcium silicate-based cement. In certain embodiments of the method, the carbonatable calcium silicate-based cement comprises calcium silicate and one or more discrete calcium silicate phases selected from CS (wollastonite or pseudowollastonite), C3S2 (rankinite), C2S (belite, larnite, bredigite), and an amorphous calcium silicate phase at about 30% or more by mass of the total phases In certain preferred embodiments, the molar ratio of Ca to Si of the composition is from about 0.5 to about 1.5. In certain preferred embodiments, the molar ratio of Ca to Si of the composition is from about 0.5 to about 1.2. In certain preferred embodiments, the molar ratio of Ca to Si of the composition is from about 0.5 to about 1.15. In certain preferred embodiments, the molar ratio of Ca to Si of the composition is from about 0.8 to about 1.5. In certain preferred embodiments, the molar ratio of Ca to Si of the composition is from about 0.8 to about 1.2. In certain preferred embodiments, the molar ratio of Ca to Si of the composition is from about 0.8 to about 1.15. In certain preferred embodiments, the molar ratio of Ca to Si of the composition is from about 0.85 to about 1.15. In certain preferred embodiments, the molar ratio of Ca to Si of the composition is from about 0.90 to about 1.10. In certain preferred embodiments, the molar ratio of Ca to Si of the composition is from about 0.95 to about 1.05. In certain preferred embodiments, the molar ratio of Ca to Si of the composition is from about 0.98 to about 1.02. In certain preferred embodiments, the molar ratio of Ca to Si of the composition is from about 0.99 to about 1.01.

The metal oxides of Al, Fe and Mg contained within the calcium silicate composition are generally controlled to be less than about 30%. In certain preferred embodiments, the composition has about 20% or less of metal oxides of Al, Fe and Mg by total oxide mass. In certain preferred embodiments, the composition has about 15% or less of metal oxides of Al, Fe and Mg by total oxide mass. In certain preferred embodiments, the composition has about 12% or less of metal oxides of Al, Fe and Mg by total oxide mass. In certain preferred embodiments, the composition has about 10% or less of metal oxides of Al, Fe and Mg by total oxide mass. In certain preferred embodiments, the composition has about 5% or less of metal oxides of Al, Fe and Mg by total oxide mass.

Calcium silicate compositions may contain amorphous (non-crystalline) calcium silicate phases in addition to the crystalline phases described above. The amorphous phase may additionally incorporate Al, Fe and Mg ions and other impurity ions present in the raw materials.

The calcium silicate compositions may also include small quantities of residual CaO (lime) and $SiO_2$ (silica). The calcium silicate composition may also include small quantities of C3S (alite, $Ca_3SiO_5$).

The C2S phase present within the calcium silicate composition may exist in any $\alpha$-$Ca_2SiO_4$, $\beta$-$Ca_2SiO_4$ or $\gamma$-$Ca_2SiO_4$ polymorph or combination thereof.

The calcium silicate compositions may also include quantities of inert phases such as melilite type minerals (melilite or gehlenite or akermanite) with the general formula $(Ca, Na, K)_2[(Mg, Fe^{2+}, Fe^{3+}, Al, Si)_3O_7]$ and ferrite type minerals (ferrite or brownmillerite or C4AF) with the general formula $Ca_2(Al, Fe^{3+})_2O_5$. In certain embodiments, the calcium silicate composition is comprised only of amorphous phases. In certain embodiments, the calcium silicate comprises only of crystalline phases. In certain embodiments, some of the calcium silicate composition exists in an amorphous phase and some exists in a crystalline phase.

In certain embodiments, the carbonatable composition includes the reactive phases that are present at about 50% or more (e.g., about 55% or more, about 60% or more, about 65% or more, about 70% or more, about 75% or more, about 80% or more, about 85% or more, about 90% or more, about 95% or more) by mass.

In certain embodiments, the carbonatable composition includes about 20% or less of metal oxides of Al, Fe and Mg by total oxide mass.

Any suitable calcium silicate composition may be used as a precursor for the bonding elements. As used herein, the term "calcium silicate composition" generally refers to naturally-occurring minerals or synthetic materials that are comprised of one or more of a group of calcium silicate phases including CS (wollastonite or pseudowollastonite, and sometimes formulated $CaSiO_3$ or $CaO \cdot SiO_2$), C3S2 (rankinite, and sometimes formulated as $Ca_3Si_2O_7$ or $3CaO \cdot 2SiO_2$), C2S (belite, $\beta$-$Ca_2SiO_4$ or larnite, $\beta$-$Ca_7Mg(SiO_4)_4$ or bredigite, $\alpha$-$Ca_2SiO_4$ or $\gamma$-$Ca_2SiO_4$, and sometimes formulated as $Ca_2SiO_4$ or $2CaO \cdot SiO_2$), a calcium-silicate based amorphous phase, each of which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It is noted that preferably the carbonatable calcium silicate compositions of the invention do not hydrate. However, minor amounts of hydratable calcium silicate phases (e.g., C2S, C3S and CaO) may be present. C2S exhibits slow kinetics of hydration when exposed to water and is quickly converted to $CaCO_3$ during $CO_2$ curing processes. C3S and CaO hydrate quickly upon exposure to water and thus should be limited to <5% by mass.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "forsterite"), $(Mg, Fe)_2SiO_4$ (also known as "olivine"), $Mg_3Si_4O_{10}(OH)_2$ (also known as "talc"), $CaMgSi_2O_6$ (also known as "diopside"), and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

A major utility of the carbonatable composition is that it can be carbonated to form composite materials that are useful in a variety of application. The carbonation, for example, may be carried out reacting it with $CO_2$ via a controlled Hydrothermal Liquid Phase Sintering (HLPS) process to create bonding elements that hold together the various components of the composite material. For example in preferred embodiments, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271, 566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. Pat. Publ. No. 2014/0314990 (application Ser. No. 14/207,920), U.S. Pat. No. 9,221,027 (application Ser. No. 14/209,238), U.S. Pub. No. 2014/0363665 (application Ser. No. 14/295,601), U.S. Pub. No. 2014/0361471 (application Ser. No. 14/295, 402), U.S. Pub. No. 2016/0355439 (application Ser. No. 14/506,079), U.S. Pub. No. 2015/0225295 (application Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074, 692), U.S. Pub. No. 2017/0102373 (application Ser. No. 15/290,328), U.S. Pub. No. 2017/0121223 (application Ser. No. 15/335,520), U.S. Pub. No. 2017/0204010 (application Ser. No. 15/409,352), U.S. Pub. No. 2017/0253530 (application Ser. No. 15/449,736), U.S. Pub. No. 2017/0260096 (application Ser. No. 15/451,344), U.S. Pub. No. 2017/0320781 (application Ser. No. 15/587,705), U.S. Pub. No. US 2017/0341989 (application Ser. No. 15/609,908), U.S. application Ser. No. 15/716,392, filed Sep. 26, 2017, U.S. application Ser. No. 15/831,135, filed Dec. 4, 2017, each of which is expressly incorporated herein by reference in its entirety for all purposes.

Figure 9:
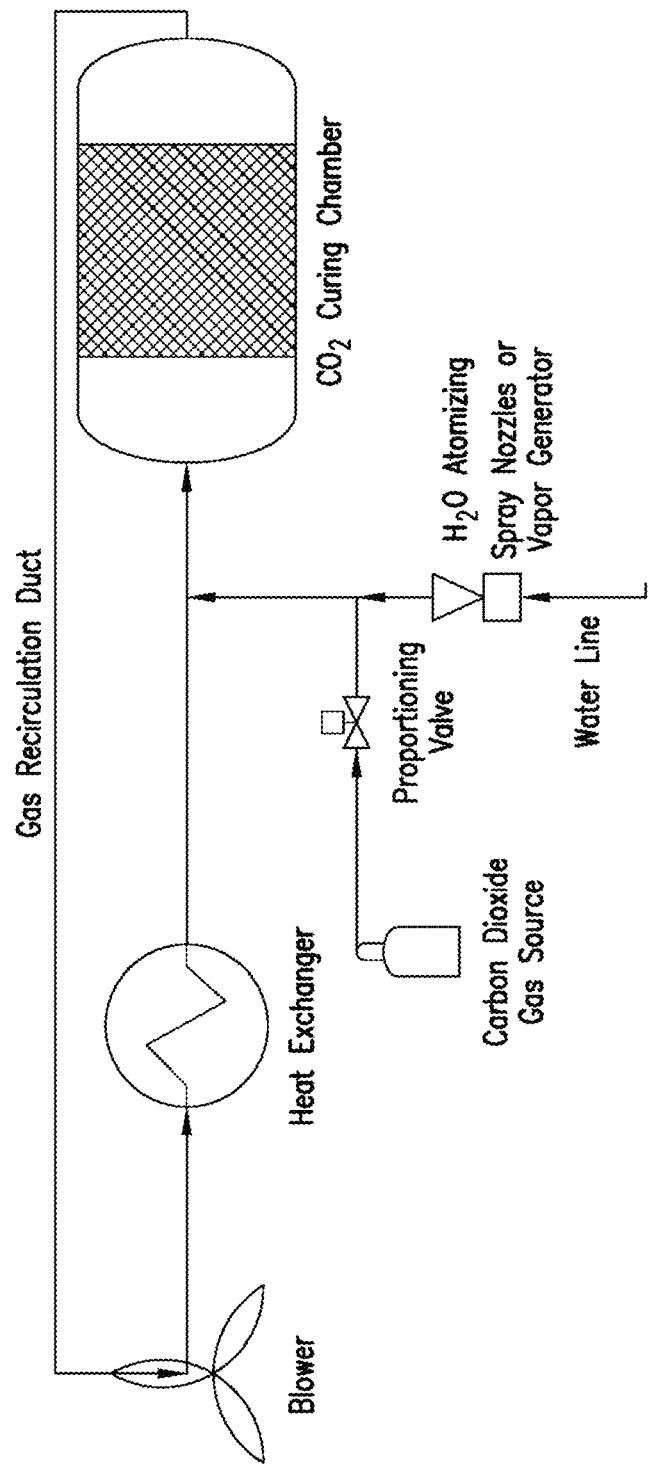
FIG. 9 is a schematic diagram of a $CO_2$ composite material curing chamber that provides humidification according to principles of the invention.
Figure 10:
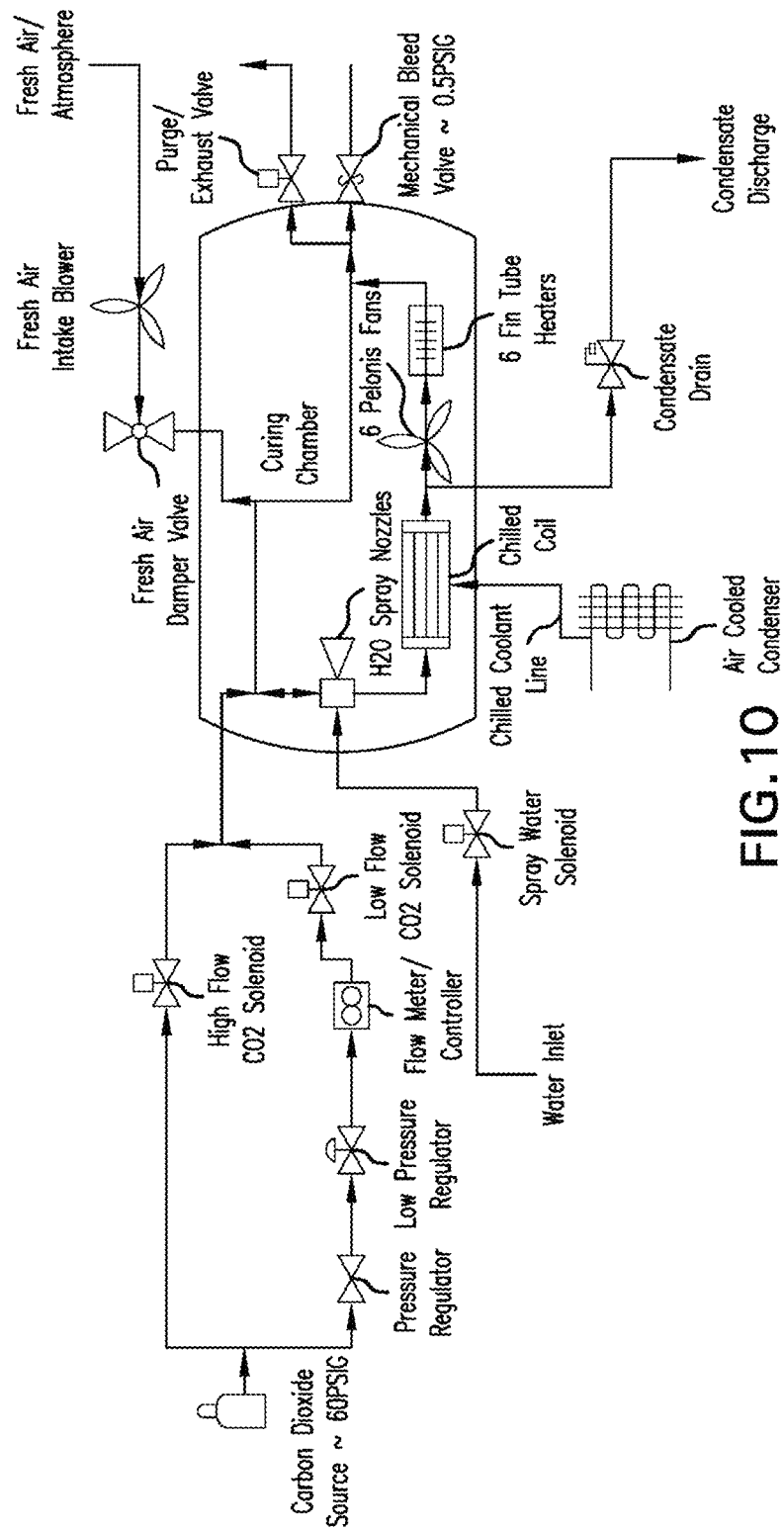
FIG. 10 is a schematic diagram of a curing chamber with multiple methods of humidity control as well as ability to control and replenish $CO_2$ using constant flow or pressure regulation and that can control the temperature according to principles of the invention.

FIG. 1 through FIG. 8 are phase diagrams that show various phase interrelationships among some of the materials described. FIG. 9 is a schematic diagram of a $CO_2$ composite material curing chamber that provides humidification according to principles of the invention. In FIG. 9, a water supply is provided and water vapor is added to the atmosphere that is circulating within the curing chamber. FIG. 10 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value.

In exemplary embodiments of carbonation of the composition of the invention, ground calcium silicate composition is used. The ground calcium silicate composition may have a mean particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 $m^2$/kg to about 700 $m^2$/kg (e.g., 150 $m^2$/kg, 200 $m^2$/kg, 250 $m^2$/kg, 300 $m^2$/kg, 350 $m^2$/kg, 400 $m^2$/kg, 450 $m^2$/kg, 500 $m^2$/kg, 550 $m^2$/kg, 600 $m^2$/kg, 650 $m^2$/kg, 700 $m^2$/kg). In exemplary embodiments of carbonation of the calcium silicate composition of the invention, ground calcium silicate particles used have a particle size having a cumulative 10% diameter greater than 1 μm in the volume distribution of the particle size distribution.

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about 1/8", about 1/4", about 3/8", about 1/2", about 3/4").

Chemical admixtures may also be included in the composite material; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

A variety of composite products can be produced from the carbonatable calcium silicate compositions of the invention by a process that does not require autoclave(s) and is suitable for continuous, large-scale production. The production methods are much improved over conventional concretes in terms of both economics and environmental impact.

EXAMPLES

Pavers are utilized as examples to illustrate the application of the disclosed invention in construction products. The same principles can be applied to manufacture other concrete products.

Pavers or paving stones are concrete blocks that are made by using a casting process, a pressing process, a compacting process, or a combination of vibration and pressing. Pavers are generally laid in interlocking pattern and can be removed when damaged during service life with a new one reducing any service interruption. Interlocking pavers could be designed to have a gap between the patterns that provides for draining of water to sub layers.

ASTM C 936 provides criteria that concrete pavers need to satisfy but is not limited to the following: an average compressive strength of 8,000 psi; an average water absorption no greater than 5%; and resistance to at least 50 freeze-thaw cycles with average material loss not exceeding 1%. In addition to the ASTM requirements, one may also wish that the pavers satisfy additional requirements, including reduced efflorescence (e.g., reduced leaching out of reaction product due to concentration gradients); good color retention; and abrasion resistance depending on where the pavers are being used.

Various additives can be used to tailor in and fine-tune the physical appearance, aesthetics, and mechanical properties of the pavers or composite construction materials, such as colorants including particles of colored materials (e.g., colored glass, colored sand, and colored quartz particles) and pigments (e.g., black iron oxide, red iron oxide, cobalt oxide and chromium oxide). In order to simulate paving stones and construction block appearance, the particulate filler materials can include fine particles. The fine particles can be $SiO_2$-based materials in order to provide hardness or they can comprise a wide variety of materials, including sand, ground, crushed or otherwise comminuted substances selected from minerals and additive materials.

These paving stones and construction block composite materials exhibit surface features typical of stone and display acceptable compressive strength and water absorption as compared to that of natural stone.

To illustrate the application of the disclosed invention, concrete pavers were produced with calcium silicate-based cement and conventional materials consisting of sand and crushed aggregate. These pavers were formed using conventional industry equipment and cured in a carbon dioxide curing chamber following procedures familiar to one skilled in the art.

Figure 13:
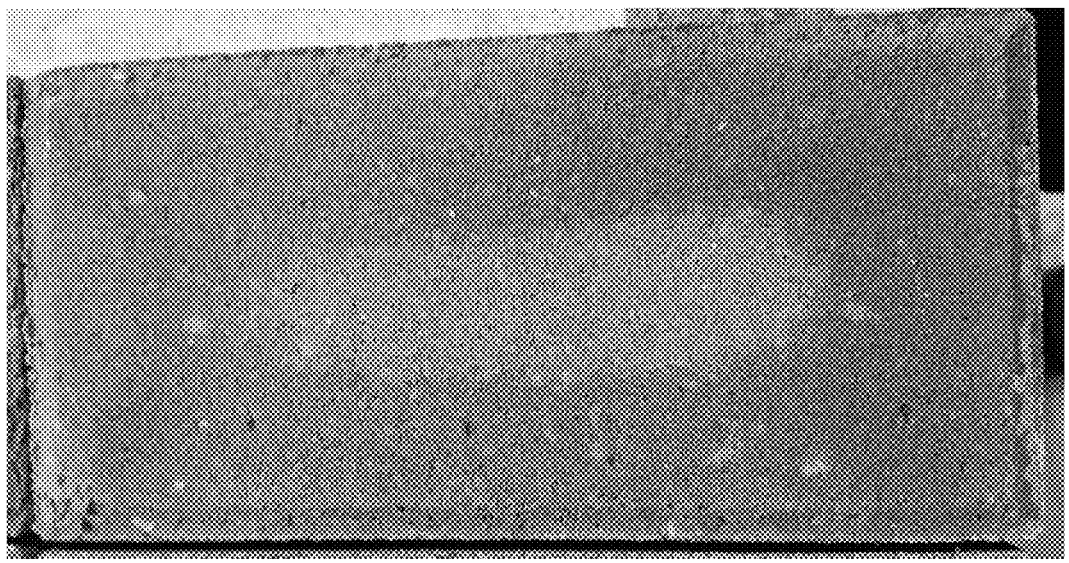
FIG. 13 shows discoloration (light-colored region at center) observed on the surface of pavers after exposure to conditions simulating service life.

After curing, these pavers were subjected to exposure conditions similar to what may be encountered during actual service life in wet or humid environments. Following this exposure, the pavers developed non-uniform discoloration as shown in FIG. 13.

Figure 14:
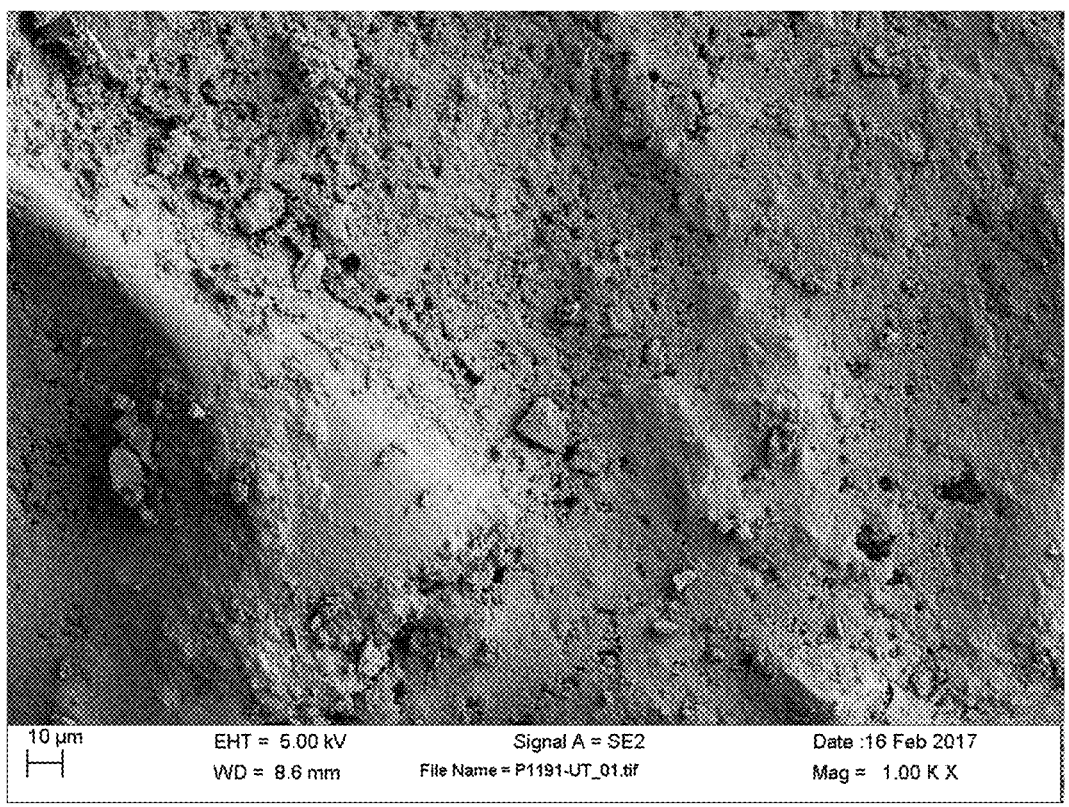
FIG. 14 shows an exemplary SEM surface image of pavers before exposure to conditions simulating service life.
Figure 15:
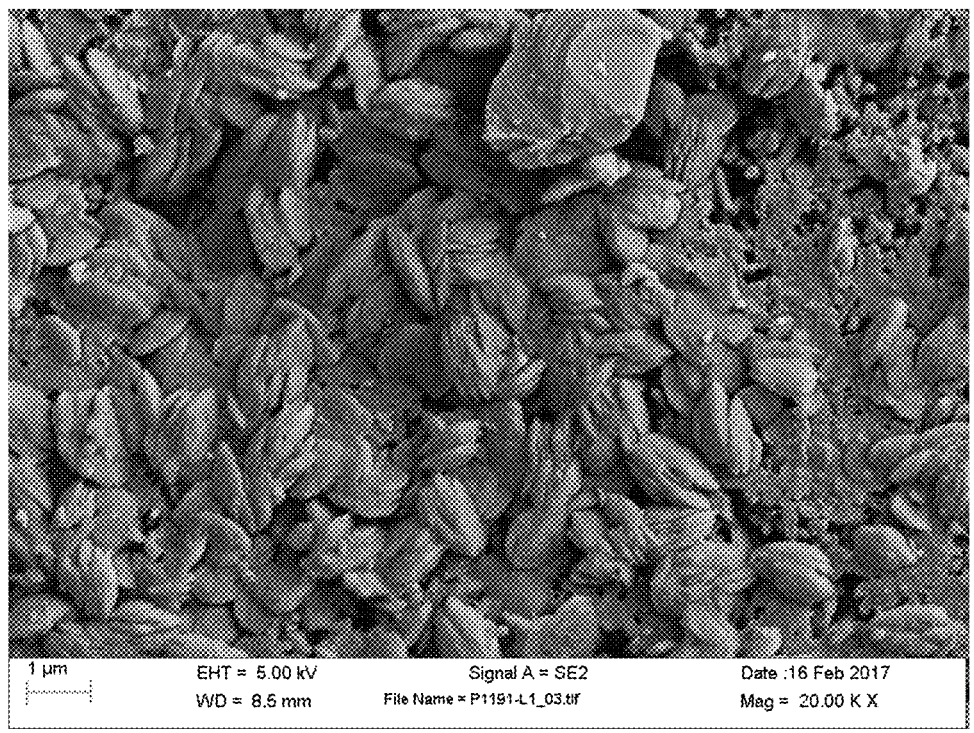
FIG. 15 shows an exemplary SEM surface image of deposits observed in the light-colored regions of pavers produced without magnesium oxide addition.

Scanning electron microscopy of paver samples prior to exposure indicate closely packed calcium carbonate surfaces (FIG. 14) while samples examined after exposure indicate the development of surface deposits in the light-colored regions of the paver with disc-shaped morphologies characteristic of vaterite. (FIG. 15).

As taught by the disclosed invention, the occurrence of surface deposits appearing as macroscopic aesthetic defects can be reduced or eliminated by the addition of sub-micron magnesium oxide during the concrete mixing process. In this process, sub-micron magnesium oxide is added to the organic polymer admixtures prior to addition to the concrete mix.

This is to aid in neutralizing the acidity of the admixtures while simultaneously insuring dispersion of the magnesium oxide powder.

Figure 16:
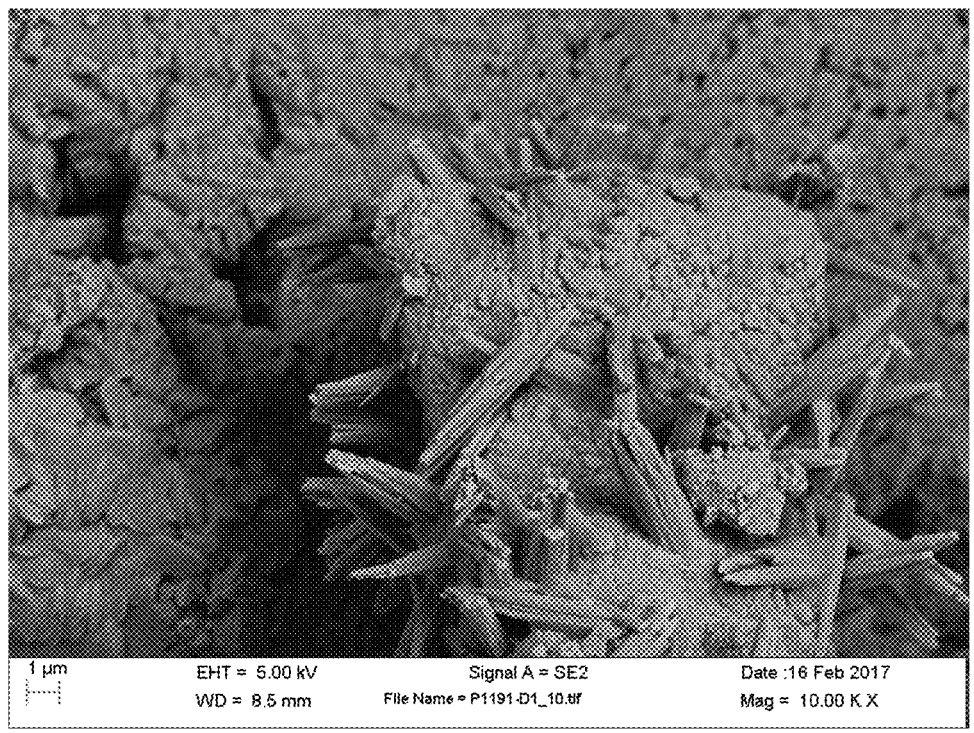
FIG. 16 shows an exemplary SEM surface image of aragonite crystals observed in pavers produced with magnesium oxide.

As shown in FIG. 16, scanning electron microscopy of paver surfaces containing magnesium oxide indicates that calcium carbonate can instead be stabilized as aragonite within the concrete matrix in order to prevent latent surface precipitation of metastable vaterite.

Figure 17:
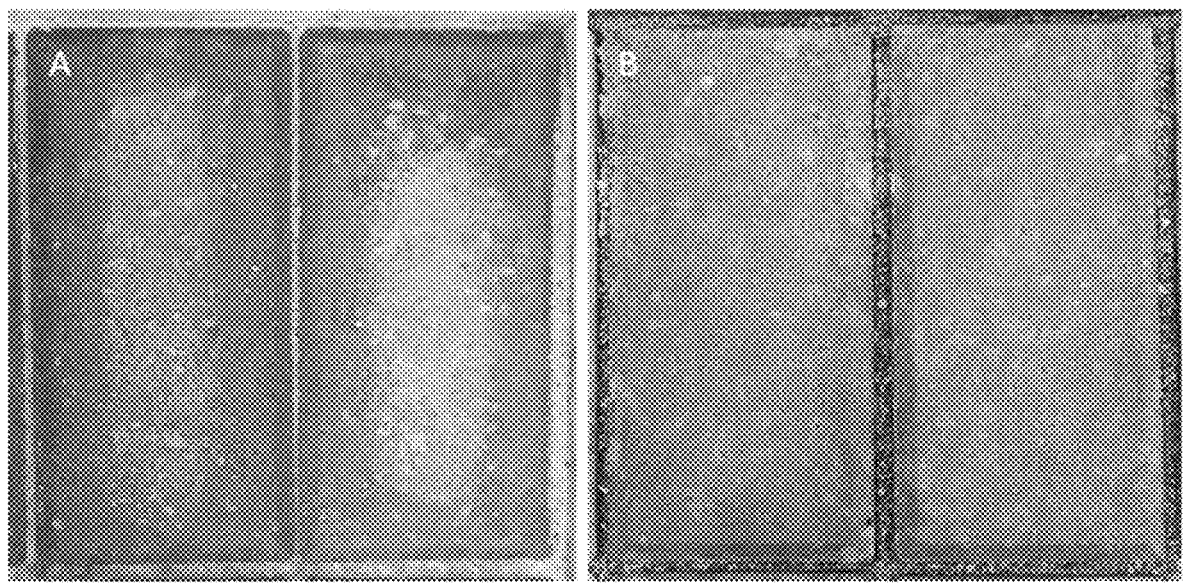
FIG. 17(A) shows pavers without magnesium oxide addition exhibit color non-uniformity resulting from the development of light-colored regions on the paver surfaces; (B) Pavers produced with the addition of magnesium oxide do not exhibit discoloration on the surface.

As exemplified in FIG. 12 and as demonstrated in FIG. 17(B), pavers produced with the addition of sub-micron magnesium oxide to the organic admixtures do not exhibit the macroscopic aesthetic defects observed on pavers produced without the addition of magnesium oxide FIG. 17(A).

Figure 18:
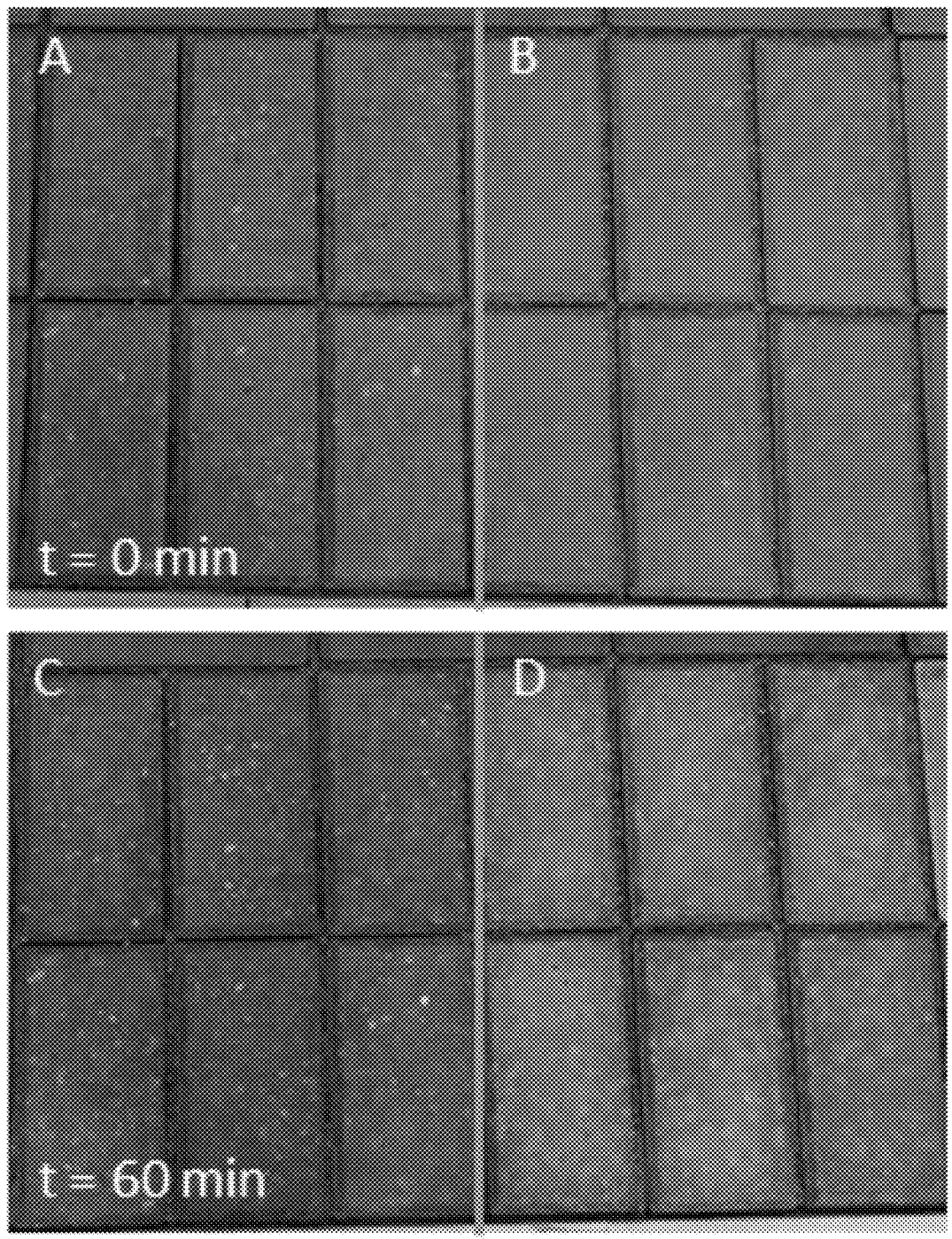
FIG. 18 shows reference pavers (A) and pavers with magnesium oxide addition (B) shown immediately after exposure to 1 hour of simulated rainwater; reference pavers (C) and pavers with magnesium oxide addition (D) shown after 1 hour of ambient drying.

As also taught by the disclosed invention, the addition of sub-micron magnesium oxide powder also improves the durability and aesthetics of calcium silicate-based cement and concrete through refinement of the cement pore structure and stabilization of fine aragonite crystals within the matrix. This allows reduced ingress and transport of water as well as reduced transport of contaminants contained in the water. An effect of this aspect is shown in FIG. 18 which demonstrates a lower degree of water ingress and subsequent faster rate of drying in pavers produced with the addition of magnesium oxide powder.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A method for forming a concrete product, comprising:
    forming a liquid admixture comprising one or more minerals and at least one organic polymer;
    prior to curing cement to form a concrete product, adding to the concrete mixture an admixture comprising one or more minerals; and
    curing the cement to form a concrete product,
    wherein the cement is a carbonatable calcium silicate-based cement, and the one or more minerals are selected from the group consisting of magnesium, magnesium oxide, magnesium nitrate, magnesium sulfate, magnesium chloride, magnesium acetate, ground dolomite, ground limestone, suspension of magnesium hydroxide, and combinations thereof.

2. The method of claim 1, wherein the one or more minerals account for about 0.02% to about 20% of the carbonatable calcium silicate-based cement.

3. The method of claim 1, further comprising adjusting the pH of the concrete mixture prior to curing the cement to form a concrete product.

4. The method of claim 1, wherein the carbonatable calcium silicate-based cement comprises calcium silicate, wherein the calcium silicate comprises one or more of CS (wollastonite or pseudowollastonite), $C_3S_2$ (rankinite), or $C_2S$ (belite, larnite, bredigite) discrete calcium silicate phases.

5. The method of claim 4, wherein the calcium silicate further comprises an amorphous calcium silicate phase at about 10% or more by mass of the total phases.

6. The method of claim 1, wherein the carbonatable calcium silicate-based cement comprises one or more of CS (wollastonite or pseudowollastonite), $C_3S_2$ (rankinite), or $C_2S$ (belite, larnite, bredigite) discrete calcium silicate phases, wherein the calcium silicate further comprises an amorphous calcium silicate phase at about 10% or more by mass of the total phases.

7. The method of claim 1, wherein the one or more minerals are selected from the group consisting of submicron magnesium oxide powder, magnesium nitrate, magnesium sulfate, magnesium chloride, magnesium acetate, and combinations thereof.

8. The method of claim 6, wherein the carbonatable calcium silicate-based cement comprises one or more melilite type phases having the general formula $(Ca,Na,K)_2[(Mg,Fe^{2+},Fe^{3+},Al,Si)_3O_7]$ or ferrite type phases having the general formula $Ca_2(Al,Fe^{3+})_2O_5$.

9. The method of claim 8, wherein the carbonatable calcium silicate-based cement comprises elemental Ca and elemental Si are present in the composition at a molar ratio from about 0.5 to about 1.5.

10. The method of claim 9, wherein the carbonatable calcium silicate-based cement comprises metal oxides of Al, Fe and Mg are present in the composition at about 30% or less by mass.

* * * * *